May 18, 1965 R. K. RUMBLE 3,184,267
RETRACTING SEAT BELT ASSEMBLY
Filed Jan. 25, 1963
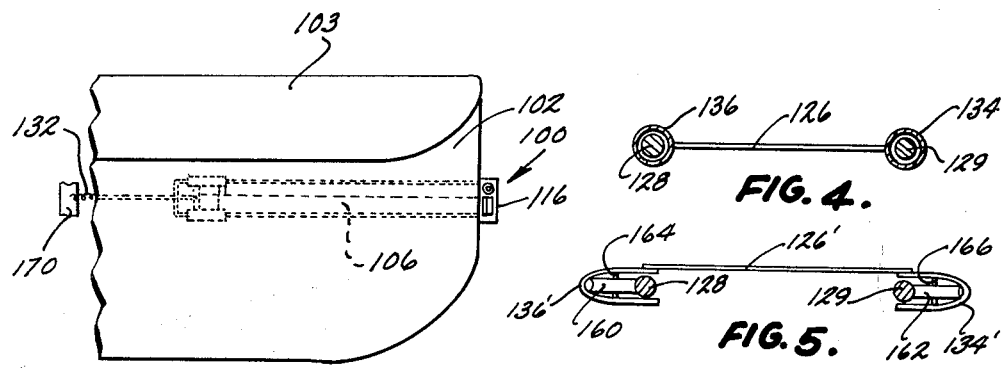
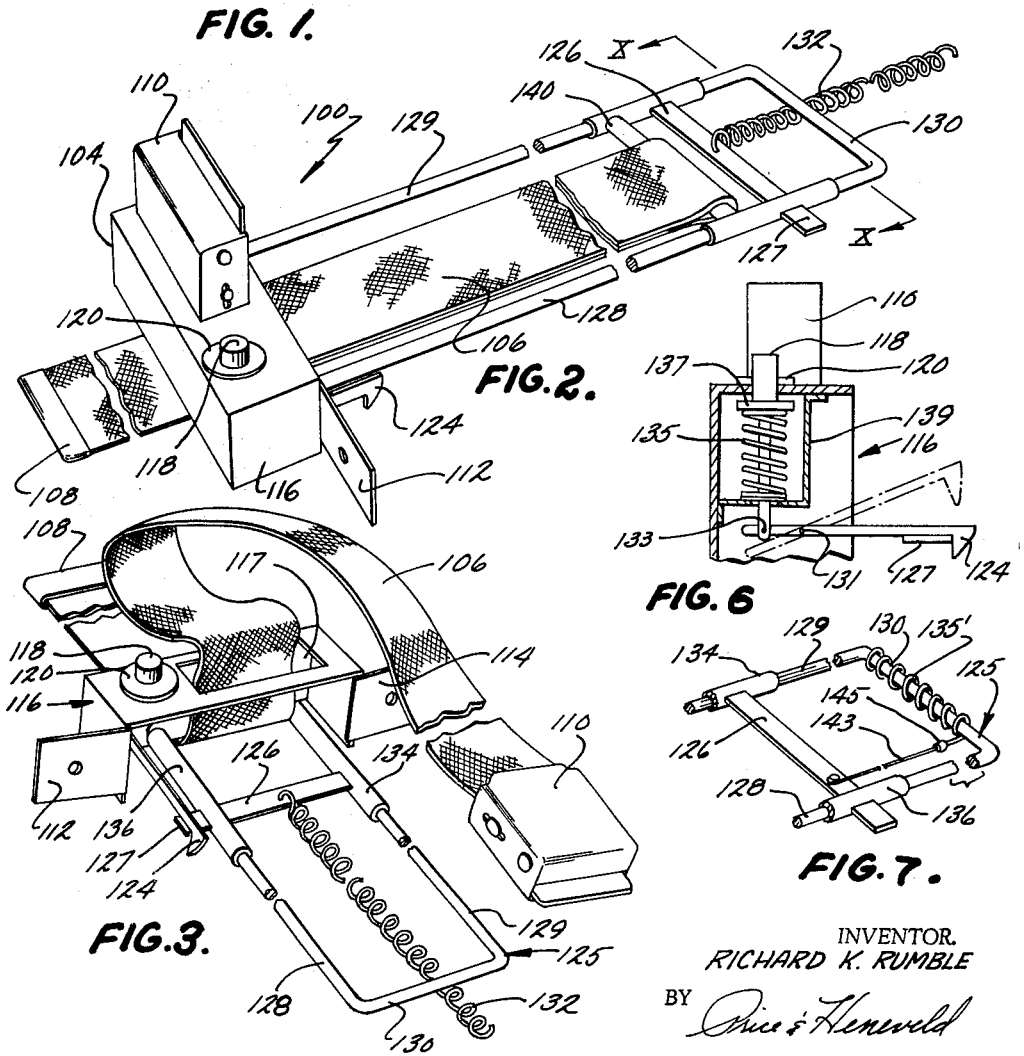
INVENTOR.
RICHARD K. RUMBLE
BY
ATTORNEYS //www.google.com/patents

United States Patent Office 3,184,267
Patented May 18, 1965

3,184,267
RETRACTING SEAT BELT ASSEMBLY
Richard K. Rumble, 1640 Laurel SE.,
Grand Rapids, Mich.
Filed Jan. 25, 1963, Ser. No. 254,553
1 Claim. (Cl. 297—388)

This invention relates to vehicle seat belts, and more particularly to an extensible-retractable seat belt mechanism.

This is a continuation-in-part application of my co-pending application entitled Seat Belt Assembly, S.N. 231,639, filed October 19, 1962, now abandoned.

Of the seat belts presently available, and of all constructions known to the inventor herein, none is capable of simultaneously providing (1) great mounting strength, (2) extendibility-retractability, (3) retention in the extended position, (4) simple releasing from the extended position to allow automatic retraction, and (5) no lessening of the mounting strength by the retracting means.

It is therefore an object of this invention to provide such a retractable seat belt assembly that has optimum strength to withstand high impact loads, yet providing an extensible-retractable construction enabling the belt to be completely retracted from the usual position on top of the seat, having means to hold it extended to prevent tension on the passenger, and having simple release means enabling the belt to be automatically retracted. Thus, the belt provides optimum safety, and comfort both during use and when not in use.

It is another object of this invention to provide a seat-mounted safety seat belt having the above qualities, and that does not detract from the aesthetic qualities of the automobile interior. It is controlled by the passenger in a simple manner with a relatively small conveniently located mechanism.

It is another object of this invention to provide a retractable seat belt assembly installable as a pre-assembled unit while possessing smooth operational qualities with complete and positive guidance of moving components, not using any valuable vehicle floor space for mounting, yet being affixed to a rigid portion of the vehicle for optimum safety.

These and other objects of this invention will be apparent upon studying the following specification in conjunction with the drawings in which:

FIG. 1 is a plan, fragmentary view of a vehicle seat and an installed retractable seat belt assembly in a second form of this invention;

FIG. 2 is a perspective view of the pre-assembled retractable belt unit in FIG. 1 with the belt retracted;

FIG. 3 is a perspective view of the unit in FIG. 2 with the belt extended;

FIG. 4 is a sectional view taken on plane X—X of the apparatus in FIG. 2;

FIG. 5 is a sectional view similar to that of FIG. 4 but with a modified form of retracting carriage;

FIG. 6 is a sectional view of the housing in FIG. 2 showing the latch means; and FIG. 7 is a fragmentary perspective view of a modified retraction spring assembly.

In the preferred form of the invention illustrated in FIGS. 1 through 7 including modifications of FIGS. 5 and 7, the biased retracting collar that slidably engages the belt comprises a special carriage that does not form an integral part of a leaf spring, but rather is reciprocable on guide ways or track means toward and away from the latch means. The belt and retracting mechanism are a preassembled unit adapted to be quickly and simply attached to a vehicular seat.

More specifically, the unit 100 is intended to be inserted beneath a seat 102 having a conventional back 103 with the housing 116 secured at the end of the seat as in FIG. 1. A like unit is mounted at the opposite end of the seat. Cooperative conventional belt stubs (not shown) with conventional ends to fit within the buckles 110 may be mounted adjacent the center of the seat as illustrated for example in U.S. patent application entitled Seat Belt Assembly, S.N. 189,128, filed April 20, 1962, by the inventor herein.

The seat belt 106 has a conventional buckle 110 on its outer end and a conventional mounting clip 108 on its opposite end for fixed attachment to a rigid part of the automobile such as the seat frame, the body floor under the seat, or the like. The buckle 110 normally rests on housing 116 above an opening 117 leading to the interior thereof. The back of housing 116 is open to fit over an opening to be made in the end of seat 102. Suitable mounting flanges 112 and 114 may be provided if desired, for attachment of housing 116 to the end of the seat. Preferably the flanges are inserted under the seat upholstery for the sake of appearance. The bottom of the housing is also preferably open to enable end 108 of belt 106 to be attached simply to a rigid member. Front 104 and the ends are closed.

The central portion of belt 106 passes around and is slidably engaged with bar 140 affixed on its ends to sleeves 134 and 136. Bar 140 may be rotatably mounted. Inwardly of cross bar 140 is a fixed spring mount cross leg 126 to which one end of tension spring 132 is attached. Protruding from one of the sleeves is a stub ear 127 to be engaged by latch 124. The cross pieces and sleeves together form a slip collar. This collar is a sliding-type carriage that reciprocates along one axis on guide ways formed by parallel rods 128 and 129. These rods in practice are merely legs of a U-shaped element 125 having a cross piece 130. The outer ends of legs 128 and 129 are affixed to the inside of housing 116 as by welding. The carriage is normally biased to its innermost position under seat 102 as shown in FIGS. 1 and 2 by spring 132 or its equivalent. Cross leg 130 then acts as a stop as well as a spacer for legs 128 and 129. The inner end of spring 132 is attached to a part of the seat or body 170 as is convenient. The seat belt and buckle are therefore normally retracted to a position that is handy for use and yet not in the way on the seat, or in a position to be slammed in the door.

When the belt is extended for use by grasping and pulling on buckle 110, the belt slides around bar 140 of the carriage, which travels along the guide ways toward housing 116 against the bias of spring 132. As the belt reaches full extension, the inner slanted surface of latch 124 is contacted and forcefully raised by ear 127 around pivotal mounting point 131 on the housing. This pivotal action is against the bias of compression spring 135 which abuts the fixed support shelf 139 on its lower end, and collar 137 of actuator 118 on its upper end. Shelf member 139 is suitably attached to the inside of housing 116 as by welding. Actuator button 118, which protrudes through an opening in the top of housing 116 and has an escutcheon plate 120 for appearance, has a shaft extending through coil spring 135 and flange 139 to be pivotally attached at 133 to the end of latch 124. This biases the latch into a locking position for the carriage. As ear 127 moves to the position shown in FIGS. 6 and 3, spring 135 pivots latch 24 to catch and lock the carriage and retain it until released. The extended belt is now without tension (FIG. 3) to be conveniently attached around the person using it without any discomfort. Since the belt is rigidly mounted at end 108, optimum safety conditions exist.

Release of the belt for retraction is achieved by simply depressing actuator 118 to pivot latch 124 and release the carriage or collar, allowing the spring 132 to retract the entire mechanism.

For quiet operation of the carriage roller elements such as ball bearings of metal, nylon, Teflon, or roller wheels 162 of plastic could be employed. Such wheels 160 and 162 would be mounted on axes 164 and 166, within modified sleeves 134' and 136' connected by cross piece 126', for example.

Also, the biasing means, instead of being a tension spring as in FIG. 2, could be a coil spring 135' mounted on cross piece 130 (FIG. 7) and attached to a nylon cord 143, for example, at 145 with cord 143 being affixed to cross piece 126.

The belt can be adjusted in length using buckle 110 as is conventionally done.

It is recognized that various obvious changes in details of the illustrated examples of the inventive structure can be made without departing from the teachings of this invention. These are deemed to be part of this invention, if within the concept presented, which is to be limited only by the scope of the appended claim and the reasonable equivalents thereto.

I claim:

A retractable seat belt assembly, comprising: a housing having mounting means for attachment to the end of a vehicle seat with one side of said housing against the seat; an elongated U-shaped carriage guide means having the free ends of the parallel legs of the U secured to said housing; a carriage having a pair of sleeves slidably mounted on the legs of said U; said carirage having a first crosspiece; a retraction spring attached to said crosspiece and extending away from said housing to normally retract said carriage toward the closed end of said U; a second crosspiece on said carriage spaced toward said housing from said first crosspiece; a belt receiving opening in the top of said housing, oriented normal to the U-shaped guide means; a seat belt extending around said second crosspiece and out said opening, and having a buckle outside said housing; said opening being larger than said belt and smaller than said buckle; belt guide means adjacent said opening; a shiftable latch mounted inside said housing alongside said U; a latch engaging portion on said carriage shiftable into operative engagement with said latch; said latch being biased into a latching position and having a camming surface engageable with said portion to be shifted momentarily against its bias for latching engagement; a latch release having portions engageable with said latch to depress it against its bias for releasing said latch from said carriage; and said release extending out the top of said housing adjacent said opening for manual actuation thereof.

References Cited by the Examiner

UNITED STATES PATENTS

| | | | |
|---|---|---|---|
| 2,071,903 | 2/37 | Shively | 297—388 |
| 2,939,519 | 6/60 | McCall | 297—388 |
| 2,963,080 | 12/60 | Zang | 297—388 |
| 3,065,027 | 11/62 | Misslich | 297—388 |

FRANK B. SHERRY, *Primary Examiner.*